United States Patent
Milne et al.

(10) Patent No.: US 9,251,607 B1
(45) Date of Patent: Feb. 2, 2016

(54) ANTI-ALIASING TECHNIQUES

(71) Applicant: Google Inc., Mountain View, CA (US)

(72) Inventors: Philip S. Milne, Palo Alto, CA (US);
Chet Haase, Pleasanton, CA (US);
Gilles Debunne, Nages (FR)

(73) Assignee: Google Inc., Mountain View, CA (US)

( * ) Notice: Subject to any disclaimer, the term of this patent is extended or adjusted under 35 U.S.C. 154(b) by 509 days.

(21) Appl. No.: 13/675,843

(22) Filed: Nov. 13, 2012

Related U.S. Application Data

(60) Provisional application No. 61/559,713, filed on Nov. 14, 2011.

(51) Int. Cl.
G06T 11/20 (2006.01)

(52) U.S. Cl.
CPC .................................... G06T 11/203 (2013.01)

(58) Field of Classification Search
None
See application file for complete search history.

(56) References Cited

U.S. PATENT DOCUMENTS

| | | | | |
|---|---|---|---|---|
| 5,392,385 | A * | 2/1995 | Evangelisti et al. | 345/611 |
| 6,947,057 | B2 * | 9/2005 | Nelson et al. | 345/611 |
| 8,063,914 | B1 * | 11/2011 | Miller et al. | 345/611 |
| 2004/0189661 | A1 * | 9/2004 | Perry et al. | 345/611 |
| 2007/0229503 | A1 * | 10/2007 | Witzel et al. | 345/428 |

OTHER PUBLICATIONS

"Chapter 6, Blending, Antialiasing, Fog, and Polygon Offset," OpenGL Programming Guide, Retrieved from the Internet: <URL: http://glprogramming.com/red/chapter06.html>. 28 pages retrieved on Nov. 13, 2012, Jan. 20, 2009.
Chan and Durand, "Chapter 22. Fast Prefiltered Lines, " GPU Gems 2, edited by Pharr and Fernando, Addison-Wesley, 20 pages, 2005.
Haeberili and Segal, "Texture Mapping as a Fundamental Drawing Primitive," Retrieved from the Internet:<URL: http://graficaobscura.com/texmap/index.html> Retrieved on Oct. 26, 2012, 11 pages, published Jun. 1993.
Segal and Akeley, The OpenGLR Graphics System: A Specification Version 2.1, Silicon Graphics, Inc., 394 pages, dated Dec. 1, 2006.
Wong et al., "Rendering anti-aliased line segments," The 2005 Computer Graphics International, Stony Brook, New York, USA, Jun. 22-24, 2005, 8 pages.

* cited by examiner

Primary Examiner — Mark Zimmerman
Assistant Examiner — Vu Nguyen
(74) Attorney, Agent, or Firm — Fish & Richardson P.C.

(57) ABSTRACT

Mechanisms for more efficiently and accurately performing anti-aliasing techniques. A bounding box for a line can be generated that includes both a central region of the line and one or more boundary regions that have various levels of opacity. Vertices for the bounding box can be provided to any of a variety of appropriate entities to interpolate pixel locations within the bounding box and to determine various levels of opacity for pixels, such as vertex shaders and/or pixel shaders. Various techniques can be used to determine a pixel's membership value within one or more of the boundary regions of a bounding box, such as using a distance from an edge of a central region to a center of the pixel and/or an area of the pixel that is located inside the boundary region.

21 Claims, 8 Drawing Sheets

ANTI-ALIASING TECHNIQUES

CROSS-REFERENCE TO RELATED APPLICATIONS

This application claims the benefit of priority Under 35 U.S.C. §119(e) of U.S. Provisional Application Ser. No. 61/559,713, filed on Nov. 14, 2011. The entire contents of which is incorporated herein by reference.

TECHNICAL FIELD

This document relates to mechanisms for anti-aliasing lines, polygons, and other objects for display on a computer system.

BACKGROUND

Computer displays have used arrays of pixels to render and visually output information to users. With such arrays of pixels, angled lines that are presented on displays can have "jaggy" artifacts that result from representation of a line using discrete pixels. Anti-aliasing techniques have been used to represent some pixels having partial coverage with regard to a line by using various levels of opacity.

SUMMARY

This document generally describes mechanisms for more efficiently and accurately performing anti-aliasing techniques. A bounding box for a line can be generated that includes both a central region of the line and one or more boundary regions that have various levels of opacity. Vertices for the bounding box can be provided to any of a variety of appropriate entities to interpolate pixel locations within the bounding box and to determine various levels of opacity for pixels, such as vertex shaders and/or pixel shaders that are implemented as part of a graphics engine and, in some instances, as part of a graphics processing unit (GPU). Various techniques can be used to determine a pixel's membership value within one or more of the boundary regions of a bounding box, such as using a distance from an edge of a central region to a center of the pixel and/or an area of the pixel that is located inside the boundary region. Such membership values can be used to determine opacity levels (alpha values) for pixels.

In one implementation, a computer-implemented method includes receiving, at a computer system, a request to render on a display a shape that is to be anti-aliased; creating, for the shape, a bounding box that is defined by a plurality of vertices in pixel space, wherein the bounding box includes i) a central region that is opaque and ii) at least one boundary region that has multiple levels of opacity; providing, by the computer system, the plurality of vertices to a shader program that interpolates locations for pixels that are included, at least partially, in the bounding box that is defined by the plurality of vertices; determining, by the shader program and for each of at least a portion of the pixels in the bounding box, whether each of at least a portion of the pixels is i) located at least partially within the at least one boundary region of the bounding box and ii), for particular pixels that are located within at least a portion of the boundary region, membership values that indicate degrees to which the particular pixels have been determined to be located in the boundary region; determining opacity values for at least the particular pixels based, at least in part, on the membership values for the particular pixels, the opacity values indicate levels of opacity for the particular pixels that are located at least in part within the boundary region; and determining color values for the particular pixels based, at least in part, on the opacity values; and causing the particular pixels in the boundary region to be displayed using the determined color values.

In another implementation, a computer system includes one or more computer processors; a graphics engine that is programmed to create, for a request to render a line with anti-aliasing, a bounding box that is defined by a plurality of vertices in pixel space, wherein the bounding box includes i) a central region that is opaque and ii) at least one boundary region that has various levels of opacity; a vertex shader that is programmed to receive the plurality of vertices from the graphics engine and to determine, for each of at least a portion of the pixels in the bounding box, whether each of at least a portion of the pixels is i) located at least partially within the at least one boundary region of the bounding box and ii), for particular pixels that are located within at least a portion of the boundary region, membership values that indicate degrees to which the particular pixels have been determined to be located in the boundary region; and a pixel shader that is programmed to determine opacity values for at least the particular pixels based, at least in part, on the membership values for the particular pixels, wherein the opacity values indicate levels of opacity for the particular pixels that are located at least in part within the boundary region.

In another implementation, a computer program product embodied in a computer storage device storing instructions that, when executed, cause one or more computer processors to perform operations including: receiving a request to render a line with anti-aliasing on a display; creating, for the line, a bounding box that is defined by a plurality of vertices in pixel space, wherein the bounding box includes i) a central region that is opaque and ii) at least one boundary region that has various levels of opacity; providing the plurality of vertices to a shader program that interpolates locations for pixels that are included, at least partially, in the bounding box that is defined by the plurality of vertices; determining, by the shader program and for each of at least a portion of the pixels in the bounding box, whether each of at least a portion of the pixels is i) located at least partially within the at least one boundary region of the bounding box and ii), for particular pixels that are located within at least a portion of the boundary region, membership values that indicate degrees to which the particular pixels have been determined to be located in the boundary region; determining opacity values for at least the particular pixels based, at least in part, on the membership values for the particular pixels, the opacity values indicate levels of opacity for the particular pixels that are located at least in part within the boundary region; and determining color values for the particular pixels based, at least in part, on the opacity values.

Certain implementations may provide one or more of the advantages. For example, by communicating vertex information to vertex and/or pixel shaders, less bandwidth can be used for the communication than techniques which may, for example, provide information regarding every pixel in a line or bounding box a shader. Accurate opacity levels for pixels can be quickly and efficiently approximated using membership values, such as distance values for pixels located within one or more boundary regions of a bounding box. By passing vertex information for a bounding box, a rendering engine may take advantage of a GPU to run a vertex shader and a pixel shader in order to reduce the size of messages passed through the rendering pipeline.

In another example, certain implementations may require less data than traditional approaches, in part because they can simplify the shape that is passed down from three or more quads to just one quad (four vertices). Such techniques can allow a shape to be rendered using four vertices, with three floats or four floats each depending on whether the shape is being anti-aliased along one or two dimensions, that are identified with, in some implementations, 48 bytes of data per line when anti-aliased along one dimension (3 floats for each of the 4 vertices—12 floats*4 bytes/float=48 bytes) or 64 bytes of data per line when anti-aliased along two dimensions (4 floats for each of the 4 vertices—16 floats*4 bytes/float=64 bytes).

In another example, through the use of a bounding box with one or more boundary regions to render a line using anti-aliasing more consistent and dependable visual results can be obtained over other approaches to anti-aliasing, such as through the use of texture maps.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
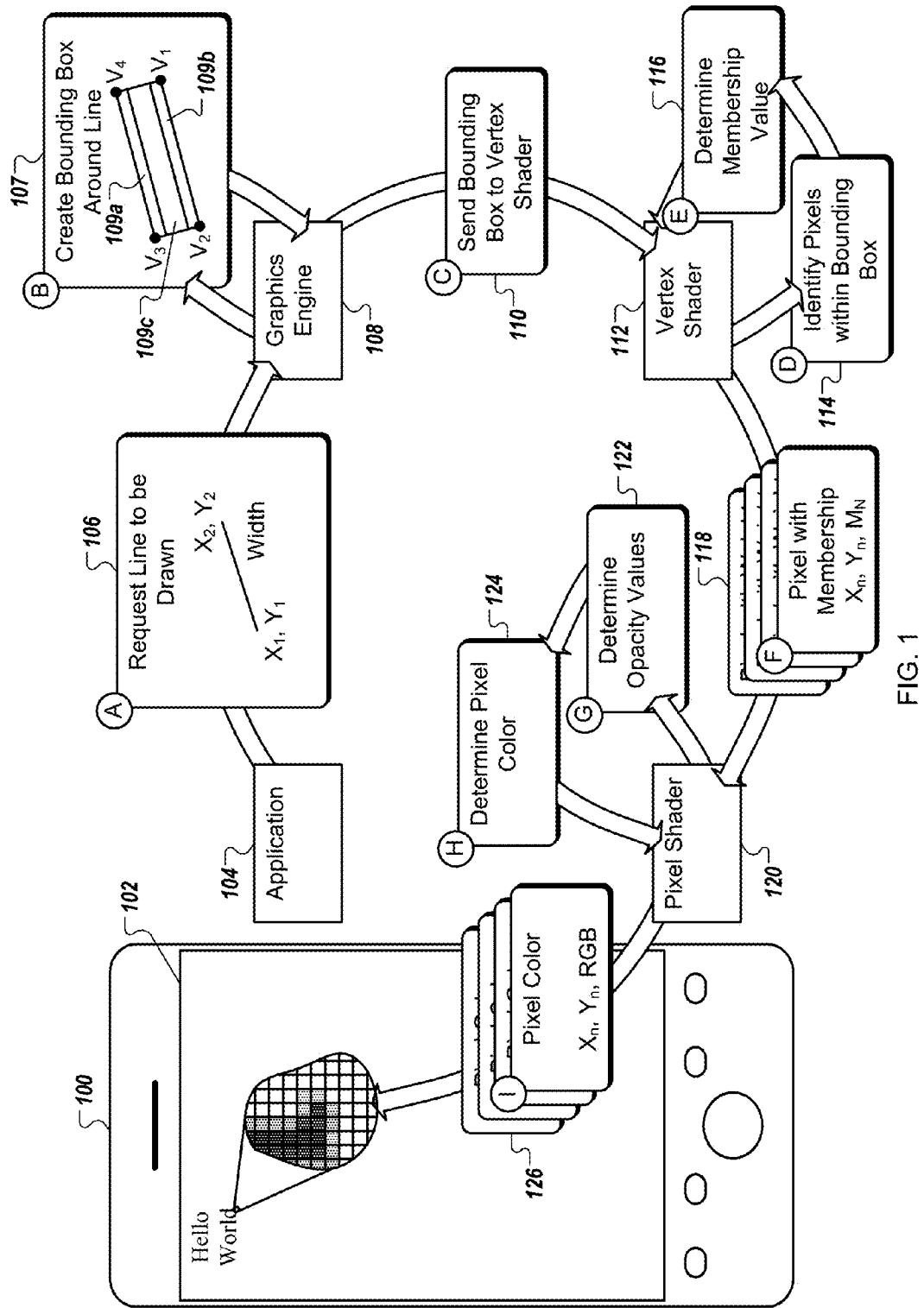
FIG. 1 is a block diagram of an example computer system for rendering a string of text with anti-aliasing.

This document generally describes mechanisms for rendering, with anti-aliasing, line objects on a display of a computing device. For example, a mobile phone with a touchscreen may display a glyph (e.g., a letter or number) that is made up of one or more lines. The edges of the lines of the glyph may be anti-aliased so that they effectively appear to have smooth and/or straight edges even though they are displayed by pixels that do not align with the edge of the line. The disclosed anti-aliasing techniques allow for amounts of data to be designated and provided for rendering anti-aliased lines, such as vertex information for a bounding box, that are small in comparison with the pixel data needed to draw the line on a display.

Shaders implemented in one or more GPUs can be used to render lines and/or other objects. The amount of information that is transmitted to shaders and/or GPUs can be minimized by the disclosed techniques and computer systems, which can increase efficiency and minimize calculations that are performed shaders at the vertex and/or pixel levels. The disclosed techniques and computer systems can provide a fast way to render visually correct anti-aliased lines (and other objects) using GPU shaders. For instance, a small set of data can be sent down to the shaders (minimizing the bandwidth that is used to provide data to shaders for rendering lines) and a small set of computations can be performed to determine how to render pixels that are part of anti-aliased lines. Graphics engines can additionally be used to determine interpolated values for pixels that are located between vertices, which can allow for less data to be provided for rendering anti-aliased lines when compared to other techniques.

To render a line using anti-aliasing, a single quad (four vertices) can be generated that represents a bounding area of the anti-aliased line. Such a quad can encompass both an opaque region of the line's interior as well as one or more fading anti-aliased regions at the line's edges. Data values can be assigned for vertices of quads using x, y position information for each vertex. Float values can be specified for the vertices as "distance" values, which can be set to 0 at two vertices on one side of the line and 1 at the other two vertices. Values can be assigned by the shaders (e.g., not per-vertex, but once for the entire operation) that represent the ratio (between 0 and 1) of the boundary region to the overall width of a line that is being rendered.

Such per-vertex values can be provided to and used by, for example OpenGL, to calculate the interpolations for pixels that are located between the vertices. For such interpolated pixels, interpolated distance values can be determined which identifies how far a pixel is from the edges of the line. A comparison of such a distance to the boundary region ratio can be made to determine whether this distance indicates that a pixel is located in any of the boundary regions. If so, a determination can be made as to how far into a boundary region a pixel lies (e.g., distance of the pixel from the line) and, using such information regarding the pixels location within a boundary region, an alpha value can be determined for the pixel. Such an alpha value can be determined using any of a variety of appropriate techniques, such as using a linear approximation which can provide a satisfactory visual result (e.g., a single pixel fading border around lines). More mathematically correct alpha values can be determined based on a pixel's distance value and additional information indicating an intersection of the bounding line with rectangular pixels in the border. Such an approach may be useful for a larger region of fading pixels, where linear artifacts might be more noticeable.

The mechanisms for rendering rectangles (e.g., lines defined by quads) with anti-aliasing that are described in this document can also be used to render other shapes, such as triangles, quadrilaterals, pentagons, other polygons, circles, ellipses, arcs, regular shapes, and/or irregular shapes. For example, an arbitrary shape can be separated into interior portions that are completely opaque and boundary regions that can be anti-aliased using the techniques described herein, where only one side of the boundary regions (sides that on the exterior of the shape) have partially translucent anti-aliased pixels (the interior sides of the boundary regions may not have partially translucent anti-aliased pixels). For example, a circle's boundary can be divided into many small line segments which approximate the exterior curve. These small line segments can be drawn with anti-aliasing by treating them as small rectangles and using the techniques described in this document for anti-aliasing lines. For instance, distance values can be used to determine levels of transparency for pixels falling within an exterior boundary region for a small line segment of the exterior curve of a circle, where distances less than a threshold distance value would indicate that corresponding pixels should be at least partially translucent. By using the disclosed mechanisms in this document to render rectangles (lines) and other shapes with anti-aliasing, less data for rendering the shapes can be provided to shaders, which can reduce the amount of bandwidth that is used to render the shapes, while at the same time providing visually accurate and dependable results.

FIG. 1 is a block diagram of an example computer system 100 for rendering a string of text with anti-aliasing (where the string of text may have characters made up of straight lines). In the depicted example, the lines that are being rendered are part of an example string of text "Hello World." The computer system 100 includes a display device 102 for displaying content to a user. The display device 102 can display pixels that emit a color according to the instructions of the computing device. From a distance, a human observer may be unable to distinguish each individual pixel. However, at nearer distances, possibly including normal usage distances, human observers may be able to identify individual pixels, especially along areas of high contrast (e.g. along the edge of a line). If an axis of the pixels does not align with the edge of the line, a visual artifact sometime referred to as "jaggies" or "pixilation" may be observed. One technique for minimizing or eliminating this artifact is called anti-aliasing, in which the colors of elements displayed in a pixel area are blended. This blending effect causes humans to recognize smooth lines in objects displayed by pixels that do not themself align with the line.

In some implementations, the computer system 100 can include one or more GPUs to perform special purpose graphic calculations. In the depicted example, a vertex shader 112 and a pixel shader 120 are described. One or both of these shaders can be programs that run on and/or are part of GPU hardware of the computer system 100. Such a vertex shader can identify pixels that are located within a bounding box that has been drawn around a line and can assign membership values that indicate where the pixels are located within the bounding box (e.g., within a boundary region, within a central region of the line). Pixel shaders can use membership values that are provided by one or more vertex shaders to determine transparency levels for pixels within a bounding box for a line and/or to determine color values for the pixels. The computer system 100 can use other configurations of GPUs, vertex shaders, and/or pixel shaders. For example, the computer system 100 can use a single shader program, and/or the vertex and/or pixel shaders can run on different hardware, such as one or more central processing units (CPUs) of the computer system 100.

Application 104 is running on the computing device 100. The application 104 may by any sort of appropriate application for the computing device 100 that displays content on the display 102. Example applications 104 include, but are not limited to, web browsers, media players, text editors, file browsers, video games, and operating system controls. The application 104 can display, in this case, text on the display 104 by providing a request 106 (step A) for one or more lines to be drawn by a graphics engine 108 of the computer device 100.

The request 106 to draw the line may be formatted according to the specifications of the graphics engine 108 or any other appropriate portion of the computing device 100. In one example, the request 106 may include two endpoints of the line defined by (X, Y) points in the pixel space of the display 102 and a width for the line.

The graphics engine 108 may be responsible for a number of graphics tasks for the computing device 100. For example, the graphics engine 108 may receive requests to draw primitive shapes (e.g., lines, triangles) on the display 102 and/or may receive requests to render complex three-dimensional virtual scenes on the display 102.

To draw the line in the request 106, the graphics engine 108 may create a bounding box around the line in the pixel space of the display 102, as indicated by step B (107). If the line of the request 106 was defined according to a different coordinate system, the graphics engine 108 may perform the appropriate coordinate space conversion to define the line in the pixel space. In some implementations, the graphics engine 108 can define the bounding box with four vertices in the pixel space. Such a bounding box can include a central region of the line and one or more bounding boxes that will receive various levels of opacity provide anti-aliasing effects for the line. The bounding box may be larger than the line of the request 106 in one or both dimensions of the pixel space, creating one or more boundary region around the line. For instance, an example bounding box is depicted as including vertices $V_1$-$V_4$, boundary regions 109a-b, and a central region 109c.

The graphics engine 108 can send vertices of the bounding box to a vertex shader 112 of the computer device 100, as indicated by step C (110). In some implementations, a message that is sent to the vertex shader 112 can include at least the four vertex locations $V_1$-$V_4$ that are specified in two float values each that identify x and y values for the four vertices. Such messages may also include one or more additional float values that specify a width value (vtxWidth) and/or a length value (vtxLength) for each of the vertices. The size of the messages can vary depending on whether lines are to be rendered using anti-aliasing along one dimension (e.g., anti-alias along the width of the line) or two dimensions (e.g., anti-alias along the width and length of the line). For example, for a line that is to be anti-aliased along one dimension (e.g., width only, length only), a message that is provided to the vertex shader 112 can include a total 12 float values (3 floats per vertex—e.g., x value, y value, and either vtxWidth or vtxLength) and can have a size of 48 bytes per message (12 floats*4 bytes/float=48 bytes). In another example, for a line that is to be anti-aliased along two dimensions (e.g., width and length), a message that is provided to the vertex shader 112 can include 16 float values (4 floats per vertex—e.g., x value, y value, vtxWidth value, vtxLength value) and can have a size of 64 bytes per message (16 floats*4 bytes/float=64 bytes). The vertex shader 112 may be, for example, a program running on a graphics processing unit of the computer device 100. Shaders can be programs that process cells within a map, such as a map defined by vertices and/or pixels in a pixel space. For example, a vertex shader can receive a set of vertices for a bounding box and can interpolate pixel values that are located within the bounding box to provide to a pixel shader. Such interpolation can allow for only information that identifies the vertices of the bounding box to be provided for rendering lines with anti-aliasing, instead of sending information for pixels that are included in the line.

As indicated by step D (114), the vertex shader 112 can identify each pixel of the display 102 that is located within the bounding box that is defined by the example vertices $V_1$-$V_4$. Pixels can be determined to be within the bounding box if one or more vertices of the pixels (e.g., corners of the pixels, center of the pixels) are located in the bounding box. For each of these pixels, the vertex shader 112 may determine whether the pixels are located in the central region of the bounding box or in one or more of the boundary regions. For at least pixels located in the one or more boundary regions, membership values can be determined that indicate degrees to which each pixel is within the boundary regions, as indicated by step E (116). A variety of techniques can be used to determine a pixel's membership value, such as determining a distance from an edge of the central region and the location of a pixel within the boundary region (e.g., distance to a center of a pixel, distance to one or more of the corners of the pixel) and/or determining a percentage of the pixel that is located within the boundary region.

As indicated by step F (118), the vertex shader 112 can provide pixel information containing the collection of pixels identified within the bounding box, along with the associated membership values, to a pixel shader 120. The pixel shader 120 may be, for example, a program running on a graphics processing unit of the computer device 100. The pixel shader 120 may be running on the same graphics processing unit as the vertex shader 112, on the same graphics processing unit but on a different core, or on a different graphics processing unit. The pixel shader 120 can take as input pixel information, can determine opacity values for the pixels, can determine pixel colors based, at least in part, on the opacity values, and can provide as output pixel colors to present on the display 102.

As indicated by step G (122), for each received pixel the pixel shader 120 can determine an opacity value for the pixel based, at least in part, on the membership values determined by the vertex shader 112. In some cases, membership values may have a linear relationship to the opacity value. For example, a membership value of 0.05 (possibly indicating that the pixel is located in the middle of a boundary region that spans from a distance of 0.00 to 0.10) may result in the pixel shader 102 determining an opacity value of 0.5 (indicating half opacity or half transparency). In another example, a membership value of 1 (possibly indicating that the pixel is located is within the central region of the bounding box) may result in the pixel shader 120 determining an opacity value of 1 (indicating full opacity or no transparency).

The pixel shader 120 may then, based at least in part on the determined opacity values, as well as other information such as the color of the line to be drawn and other content to be drawn behind the line (e.g. a background matte) determine a color for the pixels, as indicated by step H (124). For example, if the opacity value is 1, indicating full opacity, the pixel shader 120 can determine that the pixel should have the color of the line. If the opacity value is 0.5 indicating half opacity, the line is a black color, and the background matte is red, the pixel shader 120 can use a painter's algorithm to assign a color value for the pixel that is a mix of black and red.

With each pixel in the bounding box assigned a color by the pixel shader 120, the pixel shader 120 can pass the color values for the pixels for presentation on the display 102, as indicated by step I (126). For example, the pixel shader 120 may load the pixel color values into a display buffer that is read from at various time intervals (e.g., once every sixtieth of a second) by a display controller that turns the pixels of the display 102 the color indicated by the corresponding value stored in the display buffer.

Figure 2:
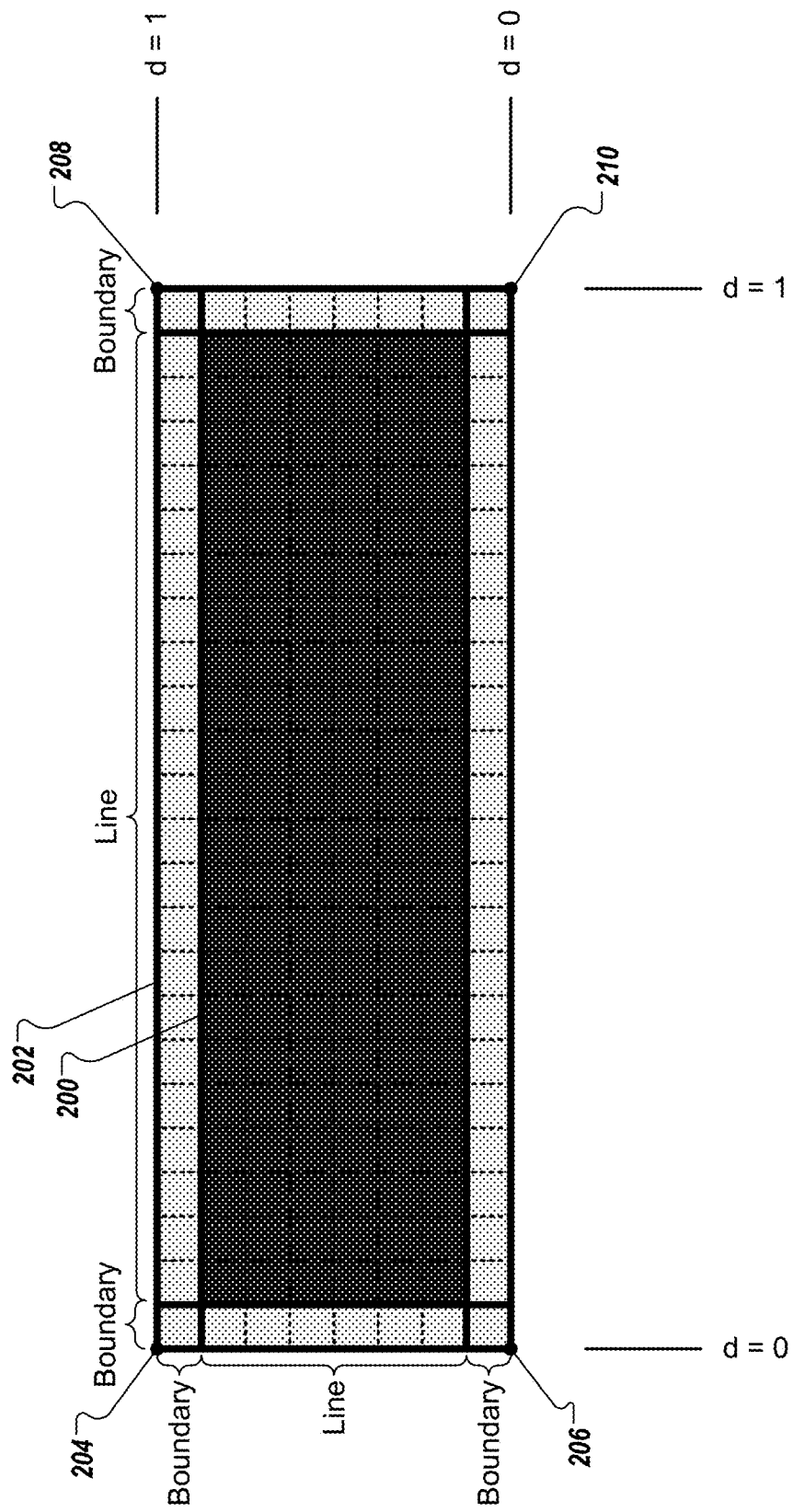
FIG. 2 is a schematic diagram of a line in a bounding box for antialiasing.

FIG. 2 is a schematic diagram of a line 200 in a bounding box 202. This line 200 may correspond, for example, to the line in the request 106 and the bounding box 202 may correspond, for example, to the bounding box created by the graphics engine 108. For purposes of illustration, the line 200 and bounding box 202 are shown with a pixel map overlaid, with the pixels aligned with the line 200 and the bounding box 202. To aid illustration, the line is shown with some transparency so that the grid of the pixel map can be seen. However the line 200 may be opaque, and the line 200 and the bounding box 202 may not always align with the axes of a pixel map, as shown below.

In this example, the line 200 is twenty two pixels wide by six pixels tall. The bounding box 202 is wider and longer than the line 200, leaving boundary regions along the top, bottom, left, and right of line 200. In this example, the boundary regions are all one pixel wide, resulting in a bounding box that is twenty four pixels wide by eight pixels tall. Other boundary widths are possible, including, for example, a boundary on one, two, or three sides of the line 200, and/or boundaries that are different widths.

In some implementations, two vertices of the bounding box 202 may be designated as at distance zero, and the other two vertices designated as distance one in that dimension. For example, the two vertices 206 and 210 on the bottom may be designated as at distance zero, and the two vertices 204 and 208 at the top designated as distance one. Any point within the bounding box may have a distance value calculated from the zero vertices in the vertical dimension, for example by interpolating where the point is in the vertical direction. This distance value, for example, may be used as a member value or in calculating a member value.

In this example, the upper and lower edge of the line 200 may have a distance value that is between the distance values zero and one, and if the distance value of a point of interest is greater than the upper bound, or lower than the lower bound, the point of interest may be determined, for example by the vertex shader 112, to be within a boundary. If the distance value of the point of interest is between the upper and lower bound distance, the point of interest may be determined, for example by the vertex shader 112, to be within the line 200.

A second set of distance values that indicate a horizontal dimension can also be used to indicate a distance between the left end and the right end of the bounding box. For example, the vertices can 204 and 206 on the left end of the bounding box can be designated as having a value of zero and vertices 208 and 210 on the right end can be designated as having values of one. The horizontal location of a pixel can be interpolated along the horizontal dimension using the values of the vertices, and can be used to determine whether a pixel is located within one or more of the boundary regions.

Figure 3A:
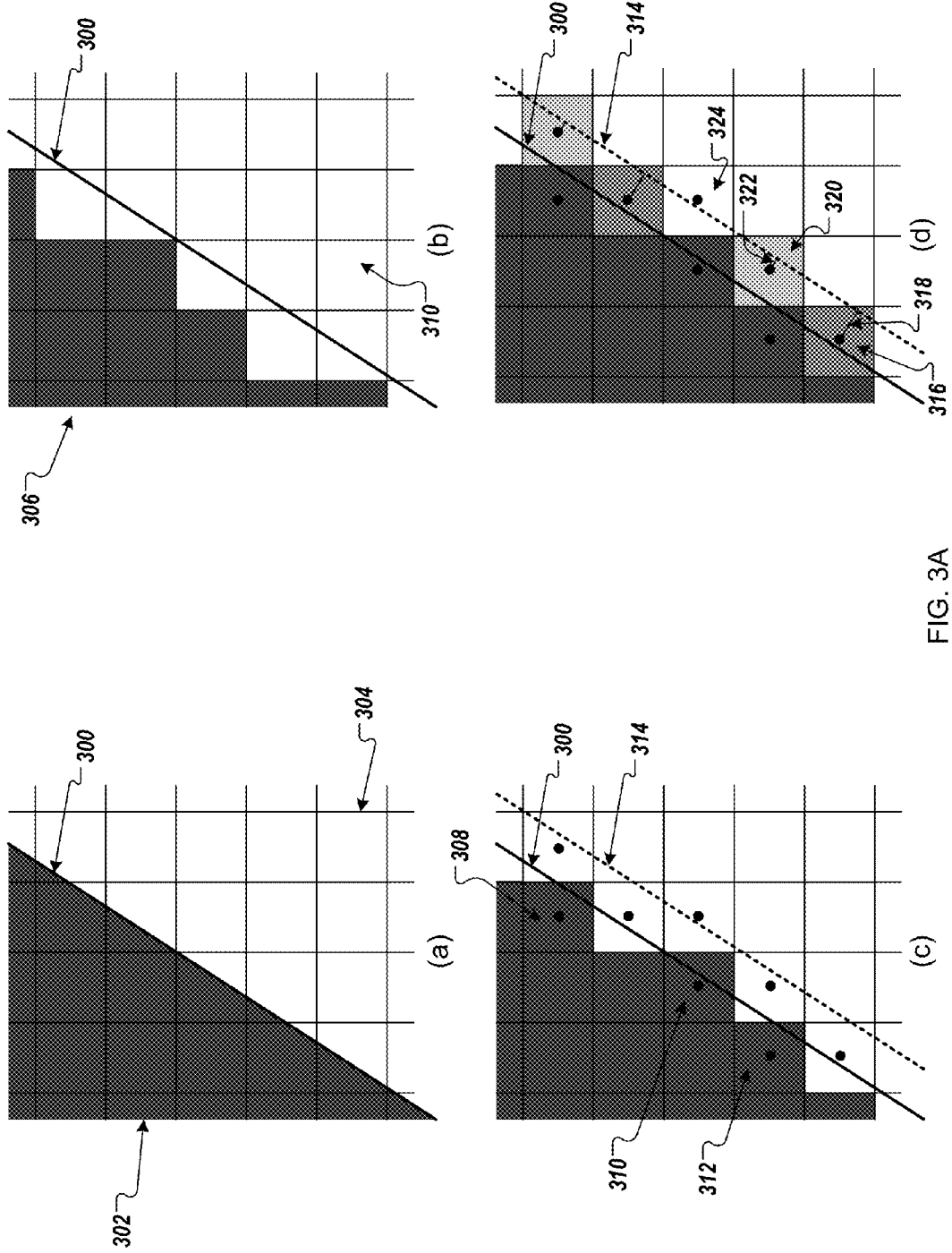
FIGS. 3A and 3B are schematic diagrams showing pixels that are shaded based on membership values that are determined for a line being rendered.
Figure 3B:
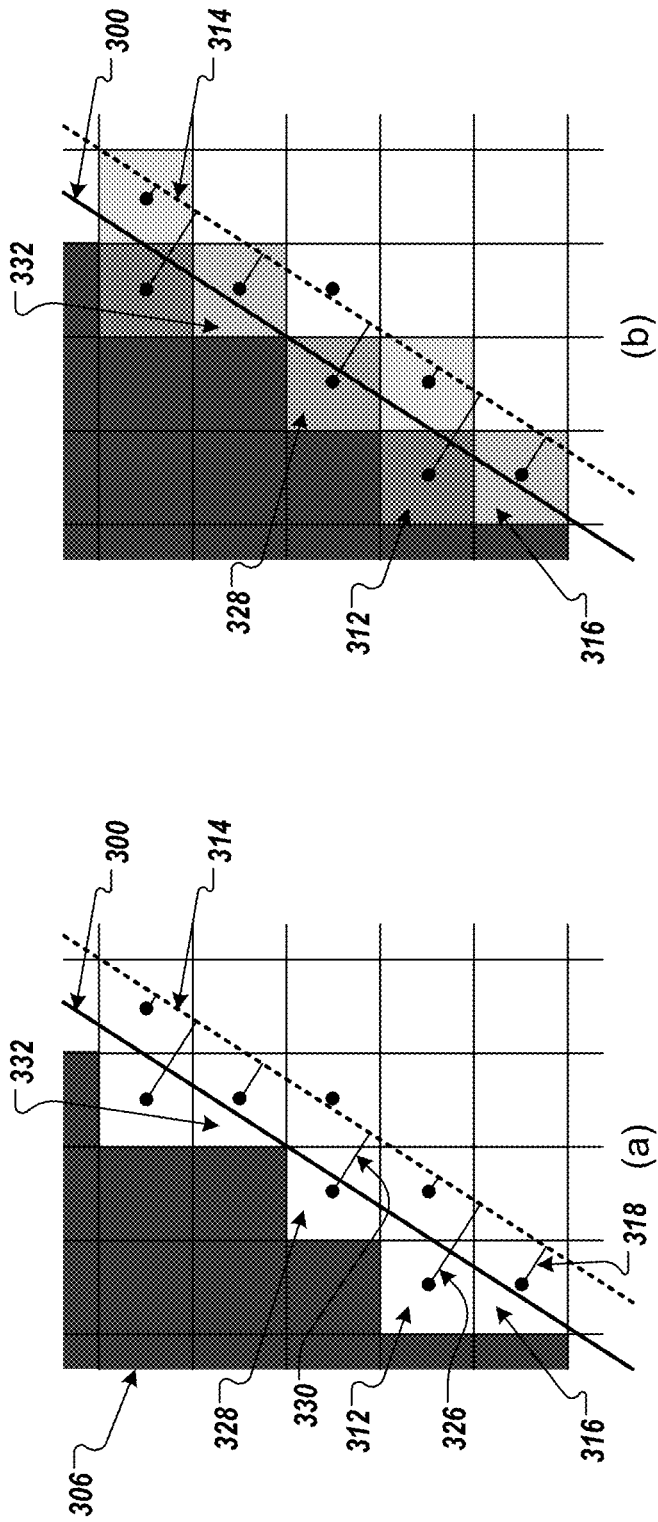

FIGS. 3A and 3B are schematic diagrams showing pixels that are shaded based on membership values that are determined for a line being rendered.

Referring to FIG. 3A, a first diagram (a) depicts a zoomed-in view of a precise boundary 300 for a true line 302 (shaded) as it overlays a grid of pixels 304. Only a portion of the precise boundary 300 and the true line 302 are depicted in the first diagram (a). The boundary 300 and the true line 302 represent an intended representation of the line 302. However, since the boundary 300 of the true line 302 bisects several of the pixels 304 at an angle, it is not possible to render the exact contours of the true line 302 and the precise boundary 300 as depicted in the first diagram (a) using the pixels 304. Instead, anti-aliasing techniques can be used to approximate the boundary 300 of the line 302 over the pixels 304, as depicted in diagrams (b)-(c) in FIG. 3A, and as depicted in diagrams (a)-(b) in FIG. 3B.

Referring to the second diagram (b) in FIG. 3A, pixels 306 (shaded) that are located entirely within the boundary 300 can be fully shaded (e.g., determined to have full opacity, determined to have no transparency).

Referring to third diagram (c) in FIG. 3A, pixels that the boundary 300 intersects and that are determined have a center vertex that is located within the boundary 302 can be fully shaded (e.g., determined to have full opacity, determined to have no transparency), such as pixels 308-312. Other or additional vertices can be used to evaluate whether pixels that are intersected by the boundary 300 should be fully shaded, such as corners of pixels. The third diagram (c) also depicts an edge 314 of a boundary region that is defined by the boundary 300 and the edge 314. In this example, the boundary region has a width of approximately one pixel, but other widths for the boundary region may also be used.

Referring to the fourth diagram (d) in FIG. 3A, distances for pixels with center vertices that are located within the boundary region (between the boundary 300 and the edge 314 of the boundary region) can be calculated and used to determine alpha values (e.g., levels of opacity, levels of transparency) for these pixels. As described above, distance can be an example membership value that indicates a degree to which a pixel is located within the line 302 and/or within the boundary region between the boundary 300 and the edge 314. For instance, example pixels 316 and 320 have center vertices that are located between the boundary 300 and the edge 314 of the boundary region. Distances 318 and 322 can be calculated for pixels 316 and 320, respectively, from their center vertices to the edge 314 of the boundary region. The distances 318 and 322 can be used to determine alpha values for the pixels 316 and 320. A variety of techniques can be used to determine such alpha values, such an example technique that linearly approximates the membership of pixels 316 and 320 based on a ratio of the distances 318 and 322 over the width of the boundary region, which in this example is approximately one pixel wide. For instance, the pixel 316 has a greater alpha value, meaning it is less transparent/more opaque, than the pixel 322 based on the distance 318 being greater than the distance 322, which can accordingly result in the pixel 316 being shaded darker than the pixel 320, as depicted in diagram (d). Other techniques for determining alpha values can also be used. Pixels with center vertices (and/or other vertices) that are located outside of the edge 314 of the boundary region may be ignored and/or considered to have an alpha value of zero, meaning they are fully transparent.

Referring to FIG. 3B, diagrams (a) and (b) depict an example alternative to diagrams (c) and (d) of FIG. 3A for determining the alpha values of pixels that intersect the boundary 300 and/or that are located in the boundary region between the boundary 300 and the edge of the boundary region. In particular, diagrams (a) and (b) of FIG. 3B depict an example of determining alpha values for pixels based on the area of a pixel that is located within the boundary 300 and/or within a boundary region (between the boundary 300 and the edge 314 of the boundary region). Such determinations of an area of a pixel that is located within the boundary 300 and/or within the boundary region can be a function of the distance between a pixel's center vertex (and/or other vertices of the pixel) and/or a shape (e.g., triangle, quadrilateral, pentagon) that results from the intersection of the boundary 300.

Referring to diagram (a) of FIG. 3B, pixels 306 that are located entirely within the boundary 300 are fully shaded (e.g., full opacity, no transparency, alpha value of one) and distance values are determined for pixels that the boundary 300 intersects and that have center vertices that are located either within the boundary 300 or within the boundary region between the boundary 300 and the edge 314. For example, a distance value 326 is determined for pixel 312 which has a center vertex that is located within the boundary 300, the distance 318 is determined for pixel 316 that the boundary 300 intersects and that has a center vertex that is located in the boundary region, and a distance value 330 is determined for a pixel 328 that is intersected by the boundary 300 and that has a center vertex that is located within the boundary 300. These distances can be used to infer the shape information from which a determination can made as to the area of the pixels 312, 316, and 328 that fall within the boundary 300. Shape information can include information regarding polygons that results from the boundary 300 intersecting the pixels 312, 326, and 328. For example, a resulting shape for pixel 312 is a pentagon (5 sided polygon) and a shape for the pixel 328 is a quadrilateral (4 sided polygon). Other shapes are also possible, such as the triangle shape (3 sided polygon) for example pixel 332. Different techniques can be used to determine the area for a pixel based on the resulting shape. For example, the area calculation for a quadrangle can be a linear function of the distance (e.g., distances 318, 326, and 330) whereas the area calculation for a triangle and/or pentagon can be a quadratic function of the distance. The determined area for can serve as a membership value for pixels, which indicates a degree to which pixels are located within the boundary and/or the boundary region, and which can be used to determine alpha values for the pixels.

Referring to diagram (b) of FIG. 3B, the area values determined for the pixels that are intersected by the boundary 300 and that have center vertices located within either the boundary 300 or the boundary region, such as example pixels 312, 316, 328, and 332, can be used to determine the alpha values for these pixels. Pixels that have a larger area that is located within the boundary 300 and/or within the boundary region can have a greater alpha value, meaning they are less transparent. For example, the pixel 312 has a larger area within the boundary 300 than pixels 316, 328, and 332, and accordingly pixel 312 has a greater (darker) shading than pixels 316, 328, and 332.

Figure 4:
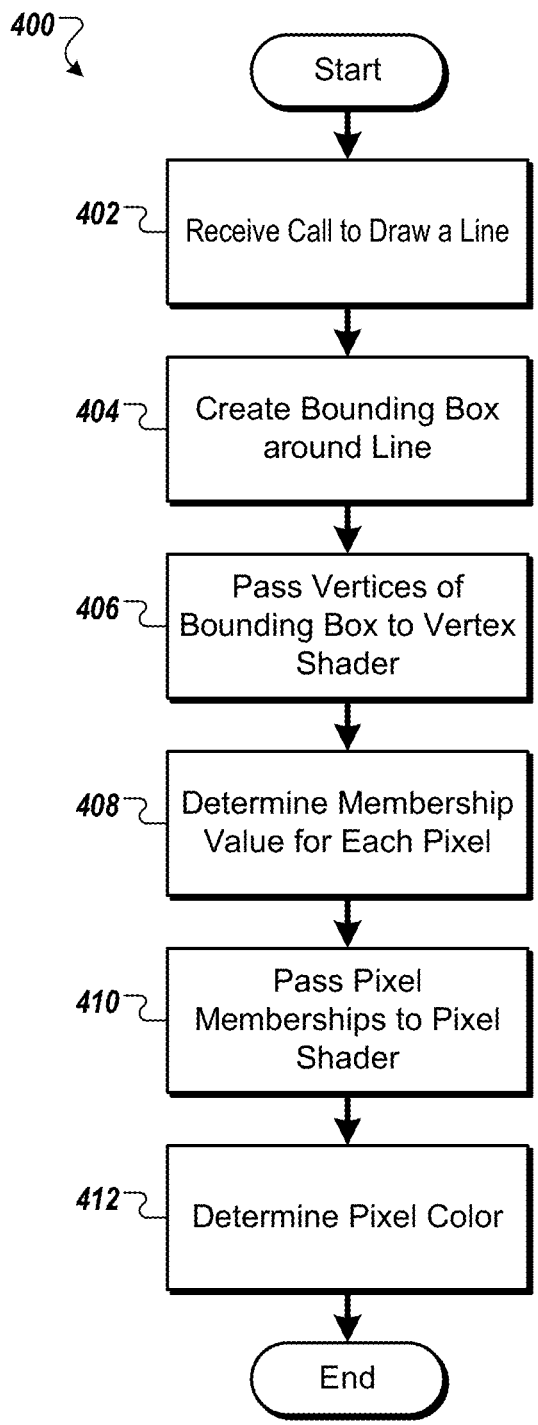
FIG. 4 is a flowchart of an example technique for rendering a line with anti-aliasing.

FIG. 4 is a flowchart of an example technique 400 for rendering a line with anti-aliasing. The technique 400 may be performed by, for example, the computer system 100, and, for purposes of clarity will be described with reference to the computer system 100. However, other systems or groups of systems may perform the technique 400 or another process for rendering with anti-aliasing a line.

A call is received to draw a line (402). For example, the application 106 can call a function or functions of the graphics engine 108 to draw a line on the display 102 of the computer device 100. In some implementations, the line may be part of another shape (e.g. an edge of a rectangle), or may be the result of some other processing by the graphics engine 108. For example, the application 104 may request that the graphics engine 108 render a three dimensional model, and the line may be produced by the rendering of the object.

A bounding box is created around the line (404). For example, the graphics engine may create a bounding box that encapsulates the line and that includes a space around the line. The bounding box may be described by, for example, two or four vertices in pixel space. Vertices of the bounding box are passed to a vertex shader (406). For example, the graphics engine 108 can pass the value of the vertices to the vertex shader 112. In some configurations, additional information may be sent. For example, some vertices may be designated as distance 0 and some vertices may be designated as distance 1. These distance designations may also be sent with the vertices to the vertex shader 112.

Membership values are determined for each pixel (408). For example, the vertex shader may identify pixels as associated with the bounding box if the pixels, for example, lies within the bounding box or has a vertex that lies within the bounding box. For each such pixel, a membership value may be calculated for the pixel. This membership value describes the degree to which a pixel is within the bounding box. Pixel membership values are passed to a pixel shader (410). For example, vertex shader 112 can pass the pixels locations and associated weights to the pixel shader 120. Pixel colors are determined (412). For example, for every pixel in the display 102 or for every pixel determined to be within the bounding box by the vertex shader 112, the pixel shader 120 can determine the color of the pixel using at least the membership value. The pixel shader may, for example, determine an opacity for the line at the pixel based on the membership value, and apply the color of the line at the determined opacity to the pixel.

Figure 5:
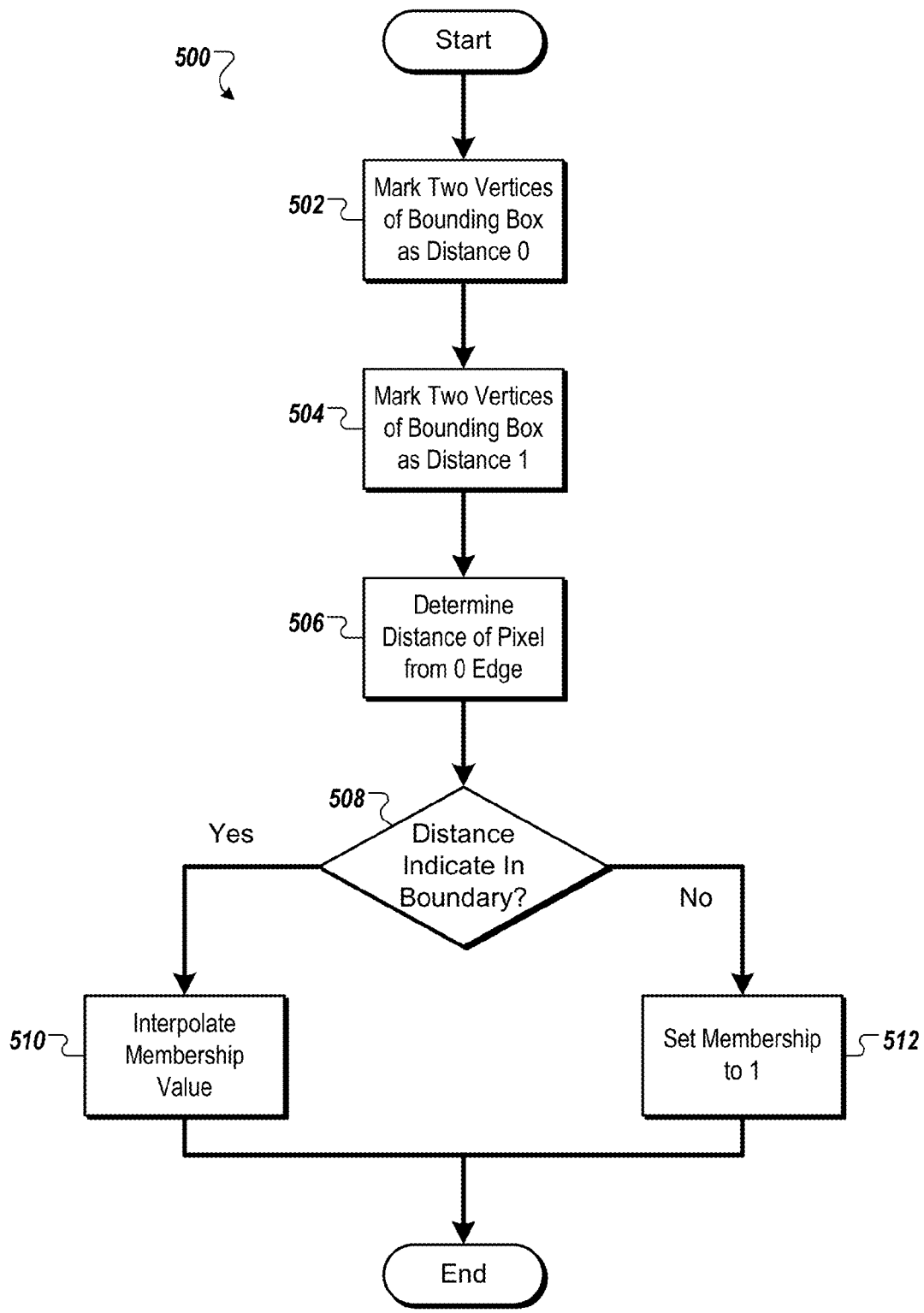
FIG. 5 is a flowchart of an example technique for determining a membership value based on a pixel's distance from the edge of a bounding box.

FIG. 5 is a flowchart of an example technique 500 for determining a membership value based on a pixels distance from the edge of a bounding box. The technique 500 may be performed by, for example, the computer system 100, and, for purposes of clarity will be described with reference to the computer system 100. However, other systems or groups of systems may perform the technique 500 or another process for determining a membership value based on a pixel distance from the edge of a bounding box.

Two vertices of a bounding box are marked as distance zero (502) and two vertices of a bounding box are marked as distance one (504). For example, for a line with a bounding box having two boundary areas, two vertices are set to distance zero by the graphics engine 108, with their shared edge becoming the zero edge of the bounding box. The other two vertices are set at distance one, with their shared edge becoming the one edge of the bounding box. Additionally, the vertex shader may find the distance from the zero edge to the two edges of the line that lay parallel to the zero edge.

The distance of a pixel from the zero edge is determined (506). For example, the vertex shader 112 can find the minimum distance between a vertex of a pixel within the bounding box to the zero edge of the bounding box. If the distance indicates that the pixel is within a boundary region of the bounding box (508), a membership value for the pixel is interpolated (510). If the distance indicates that the pixel is not within the boundary area of the bounding box (512), the membership value for the pixel can be set to one (512).

Take, for instance, an example case described in TABLE 1 below where the edges of the line are at distances 0.1 and 0.9 from the zero edge, meaning that a first boundary region spans from distance value 0.0 to 0.1 and a second boundary region spans from distance value 0.9 to 1.0. In such a case, the following table can be used to determine if a pixel distance indicates that the pixel is within a boundary region or within the line:

TABLE 1

| Pixel Distance < 0.1 | First Boundary Region |
|---|---|
| 0.1 <= Pixel Distance <= 0.9 | Line Area (Central Region) |
| 0.9 < Pixel Distance | Second Boundary Region |

If the pixel distance indicates that the pixel is within the line area, a membership value of 1 may be set for the pixel, indicating that the pixel is fully a member of the line. If the pixel distance indicates that the pixel is within the boundary region, the distance between the pixel and either the edge of the line (edge of the central region of the bounding box) or the edge of the bounding box (the zero edge or the one edge) may be determined. This distance may be used to interpolate the membership value of the pixel between 0 and 1. For example, a pixel in the boundary region very near the edge of the line (edge of the central region of the bounding box) can have a membership value near 1, while a pixel in the boundary region very near the zero edge or the one edge of the bounding box can have a membership value near 0.

For instance, the following is an example in which pixels are examined using a vertex at the center of the pixel and the example region definitions provided in TABLE 1. A first example pixel, which will be referred to here as $Pixel_1$, is identified as being within a bounding box for a line. A vertex shader can, using any of a variety of appropriate techniques, determine that the minimum distance from a line of the bounding box that has been assigned a zero value ("the zero line") to the center of $Pixel_1$ is 0.723. As shown in TABLE 1, this pixel distance of 0.723 corresponds to the line area (central region). As such, the $Pixel_1$ can be assigned a membership value of 1.0 by the vertex shader that indicates that the $Pixel_1$ is located within the line area (also referred to as the central region) of the bounding box for the line. Such a membership value can indicate that the $Pixel_1$ has full opacity (no transparency). In some implementations, the membership value for $Pixel_1$ can be determined to be 0.0 based on the $Pixel_1$ being located within the central region of the bounding box, indicating that the $Pixel_1$ has no transparency (full opacity).

A second example pixel, $Pixel_2$, is also identified as being within a bounding box for the line. A vertex shader can determine that the minimum distance from the zero line to the center vertex of $Pixel_2$ is 0.021. As shown in TABLE 1, a pixel distance of 0.021 indicates that the $Pixel_2$ is located within the first boundary region. A vertex shader can determine a membership value for the $Pixel_2$ based on a distance from the center vertex of $Pixel_2$ and an edge of the first boundary region, and further based on a width of the first boundary region (e.g., membership value=distance from edge of boundary region/width of boundary region). Such a distance can be determined from a first edge of the first boundary region that borders the central region of the bounding box, and/or from a second edge of the first boundary region that defines an edge of the bounding box. For example, the distance for the $Pixel_2$ from the second edge of the first boundary region can be 0.021 (0.0–0.021), the width of the first boundary region can be 0.1, and the resulting membership value for $Pixel_2$ can be 0.21 (0.021/0.1). Such a membership value can indicate that $Pixel_2$ has 21% opacity (79% transparency). In another example, the distance for the $Pixel_2$ from the first edge of the first boundary region can be 0.079 (0.1–0.021), the width of the first boundary region can be 0.1, and the resulting membership value for $Pixel_2$ can be 0.79 (0.079/0.1), indicating that the $Pixel_2$ has 79% transparency (21% opacity). Other techniques for determining membership values can also be used, such as techniques that use non-linear estimations for membership values based on distances between one or more edges of the first boundary region.

A third example pixel, $Pixel_3$, is also identified as being within a bounding box for the line that is described with regard to TABLE 1. A vertex shader can determine that the minimum distance from the zero line to the center vertex of the $Pixel_3$ is 0.999. As shown in TABLE 1, a pixel distance of 0.999 indicates that the $Pixel_3$ is located within the second boundary region. Similar to the description above with regard to $Pixel_2$, a vertex shader can find the distance from the center vertex of $Pixel_3$ to one or more edges of the second boundary region, such as an edge that borders the central region or another edge that defines an edge of the bounding box. For example, the distance from $Pixel_3$ to an outside edge of the second boundary region can be determined to be 0.001 (1.0–0.999), and can be used to determine a membership value for $Pixel_3$. For instance, a membership value for $Pixel_3$ can be determined to be 0.01 (0.001/0.1 (width of the second boundary region))—indicating that $Pixel_3$ has 1% opacity (99% transparency).

Figure 6:
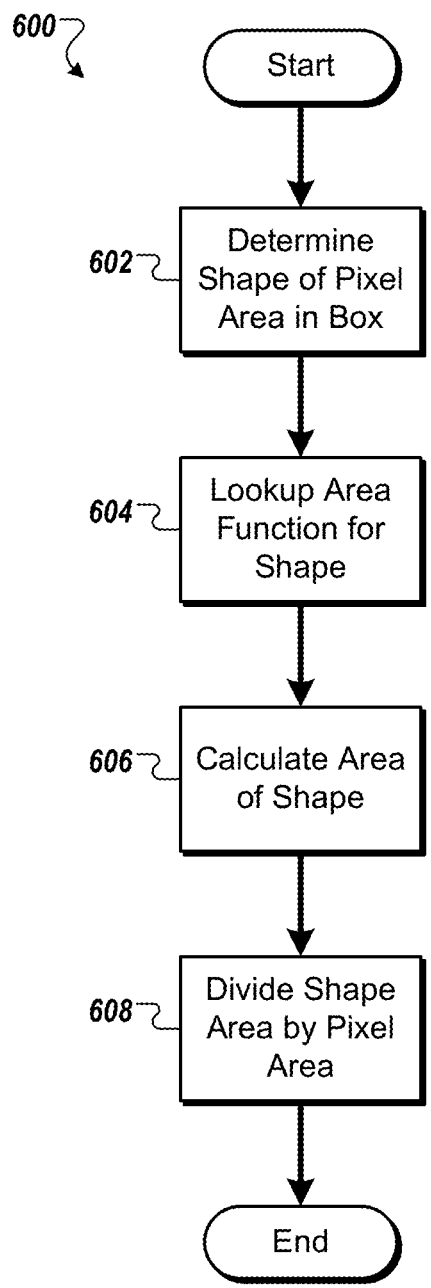
FIG. 6 is a flowchart of an example technique for determining a membership value based on the percentage of a pixel that is within a boundary region.

FIG. 6 is a flowchart of an example technique 600 for determining a membership value based on the percentage of a pixel that is within a boundary region. The process 600 may be performed by, for example, the computer system 100, and, for purposes of clarity will be described with reference to the computer system 100. However, other systems or groups of systems may perform the process 600 or another process for determining a membership value based on the percentage of a pixel within a boundary region.

In the technique 600 of the flowchart, the shape of the pixel area within the bounding box is initially determined (602). For example, for each pixel identified by the vertex shader 112 as being within the bounding box, the shape of the portion of the pixel that is within the bounding box may be determined. In some implementations, this shape may be defined by one or more vertices of the pixel (e.g. a corner or corners) and one or more intersections of the bounding box with the pixel. For an example of such the shape of pixel 312 as depicted in FIG. 3B.

An area function for the shape is looked up (604), and the area of the shape is calculated (606). In some implementations, the vertex shader 112 may have access to a lookup table or other data store that contains functions for calculating the area of a shape with a given number of vertices, given the vertex locations. The vertex shader may call the appropriate function and may provide the vertex locations, receiving back the area of the shape.

The area of the shape is then divided by the area of the pixel (608). For example, the vertex shader 112 can divide the area of the shape by the area of the pixel to determine the percentage of the pixel that is within the bounding box. This percentage may be used as the membership value, as previously described.

In the process 600, a lookup table that contains simplified area equations can be used. However, other methods of calculating areas are possible. For example, a lookup table of pre-computed shapes and sizes may be stored in memory, and the nearest entry to a shape at issue may be used as an approximation. In another example, a single function or routine that calculates the area of any arbitrary shape with any arbitrary number of vertices may be used to calculate are.

Figure 7:
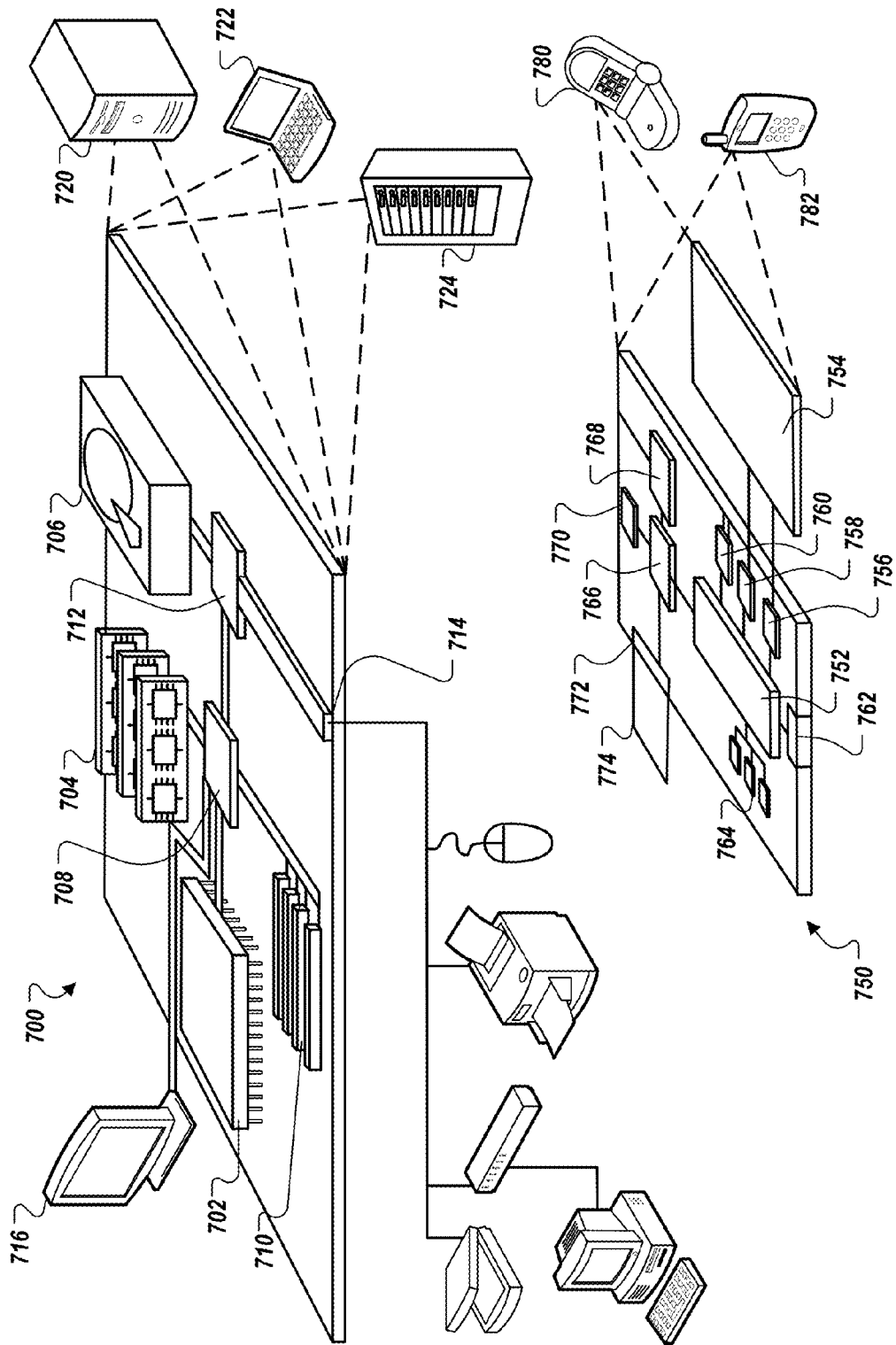
FIG. 7 is a schematic diagram that shows an example of a computing device and a mobile computing device.

FIG. 7 shows an example of a computing device 700 and an example of a mobile computing device that can be used to implement the techniques described here. The computing device 700 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. For example, the process 702, or another processor or processors (not shown) may be dedicated for graphical processing. These graphical processing processors may, in some configurations, run shaders or other programs, for example, as part of a graphics rendering pipeline. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 764, the expansion memory 774, or memory on the processor 752. In some implementations, the computer program product can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A computer-implemented method comprising:
   receiving, at a computer system, a request to render on a display a shape that is to be anti-aliased;
   creating, for the shape, a bounding box that is defined by a plurality of vertices in pixel space, wherein the bounding box comprises i) a central region that is opaque and ii) at least one boundary region that has multiple levels of opacity;
   providing, by the computer system, the plurality of vertices to a shader program that interpolates locations for pixels that are included, at least partially, in the bounding box that is defined by the plurality of vertices;
   determining, by the shader program and for each of at least a portion of the pixels in the bounding box, whether each of at least a portion of the pixels is i) located at least partially within the at least one boundary region of the bounding box and ii), for particular pixels that are located within at least a portion of the boundary region, membership values that indicate degrees to which the particular pixels have been determined to be located in the boundary region, wherein the membership values comprise area values that correspond to percentages of the particular pixels that are located within the at least one boundary region;
   determining shapes of the particular pixels that are located within the at least one boundary region;
   accessing predetermined formulas for the shapes, each of the predetermined formulas providing a mechanism for determining an area for one or more of the shapes;
   determining, using the predetermined formulas, the area values for the particular pixels;
   determining opacity values for at least the particular pixels based, at least in part, on the membership values for the particular pixels, the opacity values indicate levels of opacity for the particular pixels that are located at least in part within the boundary region; and
   determining color values for the particular pixels based, at least in part, on the opacity values; and
   causing the particular pixels in the boundary region to be displayed using the determined color values.

2. The computer-implemented method of claim 1, wherein the membership values further comprise distance values that correspond to distances between the particular pixels and one or more edges of the at least one boundary region.

3. The computer-implemented method of claim 2, further comprising:
   determining the distances for the particular pixels, wherein the distances are determined between center vertices of the particular pixels and a first edge of the at least one boundary region that borders the central region of the bounding box.

4. The computer-implemented method of claim 2, further comprising:
   determining the distances for the particular pixels, wherein the distances are determined between center vertices of particular ones of the particular pixels and a second edge of the at least one boundary region that defines an outside edge of the bounding box.

5. The computer-implemented method of claim 1, wherein the membership values and the opacity values have a linear relationship to each other.

6. The computer-implemented method of claim 1, wherein the bounding box includes at least a second boundary region.

7. The computer-implemented method of claim 1, wherein:
   the shape comprises a line that has a line width;
   the at least one boundary region has a boundary region width; and
   the bounding box has a width of the line width plus the boundary region width.

8. The computer-implemented method of claim 7, wherein the line is a part of a glyph to be graphically presented on the display.

9. The computer-implemented method of claim 1, wherein the shader program comprises a vertex shader program.

10. The computer-implemented method of claim 9, wherein determining the opacity values and determining the color values is performed by a pixel shader program that is configured to determine the color values for the particular pixels based on one or more color values for the line, the opacity values, and one or more background color values.

11. The computer-implemented method of claim 10, wherein the vertex shader program is run on a graphics processing unit and the pixel shader program is run on the graphics processing unit.

12. The computer-implemented method of claim 1, wherein the shape comprises a polygon.

13. A computer system comprising:
   one or more computer processors;
   a graphics engine that is programmed to create, for a request to render a line with anti-aliasing, a bounding box that is defined by a plurality of vertices in pixel space, wherein the bounding box comprises i) a central region that is opaque and ii) at least one boundary region that has various levels of opacity;
   a vertex shader that is programmed to receive the plurality of vertices from the graphics engine and to determine, for each of at least a portion of the pixels in the bounding box, whether each of at least a portion of the pixels is i) located at least partially within the at least one boundary region of the bounding box and ii), for particular pixels that are located within at least a portion of the boundary region, membership values that indicate degrees to which the particular pixels have been determined to be located in the boundary region, wherein the membership values comprise area values that correspond to percentages of the particular pixels that are located within the at least one boundary region, wherein the vertex shader is further programmed to i) determine shapes of the particular pixels that are located within the at least one boundary region, ii) access predetermined formulas for the shapes, each of the predetermined formulas providing a mechanism for determining an area for one or more of the shapes, and iii) determine, using the predetermined formulas, the area values for the particular pixels; and a pixel shader that is programmed to determine opacity values for at least the particular pixels based, at least in part, on the membership values for the particular pixels, wherein the opacity values indicate levels of opacity for the particular pixels that are located at least in part within the boundary region.

14. The system of claim 13, wherein the membership values further comprise distance values that correspond to distances between the particular pixels and one or more edges of the at least one boundary region.

15. The system of claim 14, wherein the vertex shader is further programmed to determine the distances for the particular pixels, wherein the distances are determined between center vertices of the particular pixels and a first edge of the at least one boundary region that borders the central region of the bounding box.

16. The system of claim 14, wherein the vertex shader is further programmed to determine the distances for the particular pixels, wherein the distances are determined between center vertices of the particular pixels and a second edge of the at least one boundary region that defines an outside edge of the bounding box.

17. The computer system of claim 13, wherein the bounding box includes at least a second boundary region.

18. The computer system of claim 13, wherein:
the line that has a line width;
the at least one boundary region has a boundary region width; and
the bounding box has a width of the line width plus the boundary region width.

19. The computer system of claim 13, wherein the line is a part of a glyph to be graphically presented on a display.

20. The computer system of claim 13, wherein the membership values and the opacity values have a linear relationship to each other.

21. A computer program product embodied in a non-transitory computer storage device storing instructions that, when executed, cause one or more computer processors to perform operations comprising:

receiving a request to render a line with anti-aliasing on a display;

creating, for the line, a bounding box that is defined by a plurality of vertices in pixel space, wherein the bounding box comprises i) a central region that is opaque and ii) at least one boundary region that has various levels of opacity;

providing the plurality of vertices to a shader program that interpolates locations for pixels that are included, at least partially, in the bounding box that is defined by the plurality of vertices;

determining, by the shader program and for each of at least a portion of the pixels in the bounding box, whether each of at least a portion of the pixels is i) located at least partially within the at least one boundary region of the bounding box and ii), for particular pixels that are located within at least a portion of the boundary region, membership values that indicate degrees to which the particular pixels have been determined to be located in the boundary region, wherein the membership values comprise area values that correspond to percentages of the particular pixels that are located within the at least one boundary region;

determining shapes of the particular pixels that are located within the at least one boundary region;

accessing predetermined formulas for the shapes, each of the predetermined formulas providing a mechanism for determining an area for one or more of the shapes;

determining, using the predetermined formulas, the area values for the particular pixels;

determining opacity values for at least the particular pixels based, at least in part, on the membership values for the particular pixels, the opacity values indicate levels of opacity for the particular pixels that are located at least in part within the boundary region; and determining color values for the particular pixels based, at least in part, on the opacity values.

* * * * *